US012803136B2

(12) United States Patent
Kim

(10) Patent No.: US 12,803,136 B2
(45) Date of Patent: Nov. 17, 2026

(54) SECONDARY BATTERY

(71) Applicant: SAMSUNG SDI CO., LTD., Yongin-si (KR)

(72) Inventor: Dae Kyu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 500 days.

(21) Appl. No.: 18/487,882

(22) Filed: Oct. 16, 2023

(65) Prior Publication Data

US 2024/0291124 A1 Aug. 29, 2024

(30) Foreign Application Priority Data

Feb. 27, 2023 (KR) ........................ 10-2023-0026127

(51) Int. Cl.

| | |
|---|---|
| ***H01M 50/593*** | (2021.01) |
| ***H01M 50/107*** | (2021.01) |
| ***H01M 50/152*** | (2021.01) |
| ***H01M 50/325*** | (2021.01) |
| ***H01M 50/531*** | (2021.01) |
| ***H01M 50/586*** | (2021.01) |
| ***H01M 50/627*** | (2021.01) |

(52) U.S. Cl.

CPC ....... *H01M 50/593* (2021.01); *H01M 50/107* (2021.01); *H01M 50/152* (2021.01); *H01M 50/325* (2021.01); *H01M 50/531* (2021.01); *H01M 50/586* (2021.01); *H01M 50/627* (2021.01); *H01M 2200/20* (2013.01)

(58) Field of Classification Search

CPC ............. H01M 50/593; H01M 50/586; H01M 50/107; H01M 50/531; H01M 50/152; H01M 50/627; H01M 50/325; H01M 2220/20

USPC ............................................................ 429/54

See application file for complete search history.

(56) References Cited

U.S. PATENT DOCUMENTS

| | | | | |
|---|---|---|---|---|
| 2007/0154789 | A1 | 7/2007 | Chang et al. | |
| 2014/0199567 | A1 | 7/2014 | Kim | |
| 2017/0194619 | A1* | 7/2017 | Kim | H01M 50/325 |
| 2018/0047949 | A1* | 2/2018 | Sugimoto | H01M 10/0587 |
| 2020/0020897 | A1 | 1/2020 | Enomoto et al. | |
| 2020/0340592 | A1* | 10/2020 | Nakayama | F16K 17/02 |
| 2021/0074977 | A1* | 3/2021 | Ko | H01M 50/583 |

(Continued)

FOREIGN PATENT DOCUMENTS

| | | |
|---|---|---|
| EP | 2 706 604 B1 | 9/2016 |
| JP | 7123226 B2 | 8/2022 |
| KR | 10-0779001 B1 | 11/2007 |

OTHER PUBLICATIONS

Extended European Search Report, Application No. 23217532.3, issued on Jun. 19, 2024, 7 pps.

*Primary Examiner* — James M Erwin

(74) *Attorney, Agent, or Firm* — Womble Bond Dickinson (US) LLP

(57) ABSTRACT

The secondary battery comprises an electrode assembly including a lead tab, a case accommodating the electrode assembly and an electrolyte solution, a cap assembly electrically connected to the lead tab, and coupled to the case to seal the case, and an insulating plate between the electrode assembly and the cap assembly in the case, defining a tab opening for drawing out the lead tab, and including thin film portions respectively defining cutouts for passage of electrolyte solution or gas.

12 Claims, 8 Drawing Sheets

(56) References Cited

U.S. PATENT DOCUMENTS

| | | | | |
|---|---|---|---|---|
| 2021/0119299 | A1* | 4/2021 | Enomoto ............ | H01M 50/184 |
| 2022/0367917 | A1* | 11/2022 | Takahashi ........... | H01M 10/052 |
| 2023/0011365 | A1 | 1/2023 | Enomoto et al. | |
| 2023/0055727 | A1* | 2/2023 | Xu ...................... | H01M 50/627 |
| 2023/0064158 | A1* | 3/2023 | Yoshida .............. | H01M 50/107 |

* cited by examiner

SECONDARY BATTERY

CROSS-REFERENCE TO RELATED APPLICATION

The present application claims priority to and the benefit of Korean Patent Application No. 10-2023-0026127, filed on Feb. 27, 2023, in the Korean Intellectual Property Office, the entire disclosure of which is incorporated herein by reference.

BACKGROUND

1. Field

The present disclosure relates to a secondary battery.

2. Description of the Related Art

A secondary battery basically includes an electrode assembly, a case that accommodates the electrode assembly and electrolyte solution therein, and a cap assembly that is coupled to an opening of the case and that seals the case. In addition, an insulating plate is positioned between the electrode assembly and the cap assembly in the case to insulate the electrode assembly and the cap assembly.

The insulating plate may be formed of an insulating film made of polypropylene (PP) material, which is typically manufactured by an extrusion molding method, and various openings may be formed therein by a mold punching method. For example, an opening for drawing out a lead tab of the electrode assembly, an opening for electrolyte solution injection, and an opening for discharging gas generated from the electrode assembly may be located on the insulating plate.

SUMMARY

The present disclosure provides a secondary battery equipped with an insulating plate that facilitates electrolyte solution and gas passage in a secondary battery equipped with an insulating plate, and of which an opening area can be controlled by an external pressure.

A secondary battery according to one or more embodiments includes an electrode assembly including a lead tab, a case accommodating the electrode assembly and an electrolyte solution, a cap assembly electrically connected to the lead tab, and coupled to the case to seal the case, and an insulating plate between the electrode assembly and the cap assembly in the case, defining a tab opening for drawing out the lead tab, and including thin film portions respectively defining cutouts for passage of electrolyte solution or gas.

The insulating plate may include a base portion integrally connected to the thin film portions and surrounding the thin film portions in plan view, wherein the tab opening is defined by the base portion.

The base portion may have a first thickness, wherein the thin film portions have a second thickness that is less than the first thickness.

The thin film portions may be circular, and may have a same diameter.

The thin film portions may contact each other and may be aligned along two directions that are orthogonal to each other.

The cutouts may include a cross-shaped cutout portion including a first cutout line and a second cutout line that are orthogonal to each other to separate the thin film portions into four thin films.

A secondary battery according to one or more embodiments includes an electrode assembly including a lead tab, a case accommodating the electrode assembly and an electrolyte solution, a cap assembly electrically connected to the lead tab, and coupled to the case to seal the case, and an insulating plate between the electrode assembly and the cap assembly in the case, and defining a tab opening for drawing out the lead tab, wherein the insulating plate comprises thin film portions, each of the thin film portions including thin films separated by cutouts, and the thin films are configured to be deformed by external pressure to change an opening area of the insulating plate.

The thin film portions may touch each other, and may be aligned along a first direction and a second direction that are orthogonal to each other.

The thin film portions may be circular.

The cutouts may include a cross-shaped cutout portion including a first cutout line and a second cutout line that are orthogonal to each other.

The thin films may be configured to be deformed convexly toward the electrode assembly when the electrolyte solution is injected to enlarge the opening area of the insulating plate, and may be configured to return to an initial position after the electrolyte solution injected.

The thin films may be configured to be deformed convexly toward the cap assembly when gas is generated in the electrode assembly to enlarge the opening area of the insulating plate, and may be configured to return to an initial position after the gas is discharged.

In the secondary battery according to the present disclosure, the insulating plate has a configuration in which the opening area is automatically adjusted while thin film portions are deformed by external pressure. The secondary battery equipped with such an insulating plate is suitable for injection of electrolyte solution and for discharging gas, and can insulate reliably between electrode assembly and the cap assembly.

DETAILED DESCRIPTION

Figure 1:
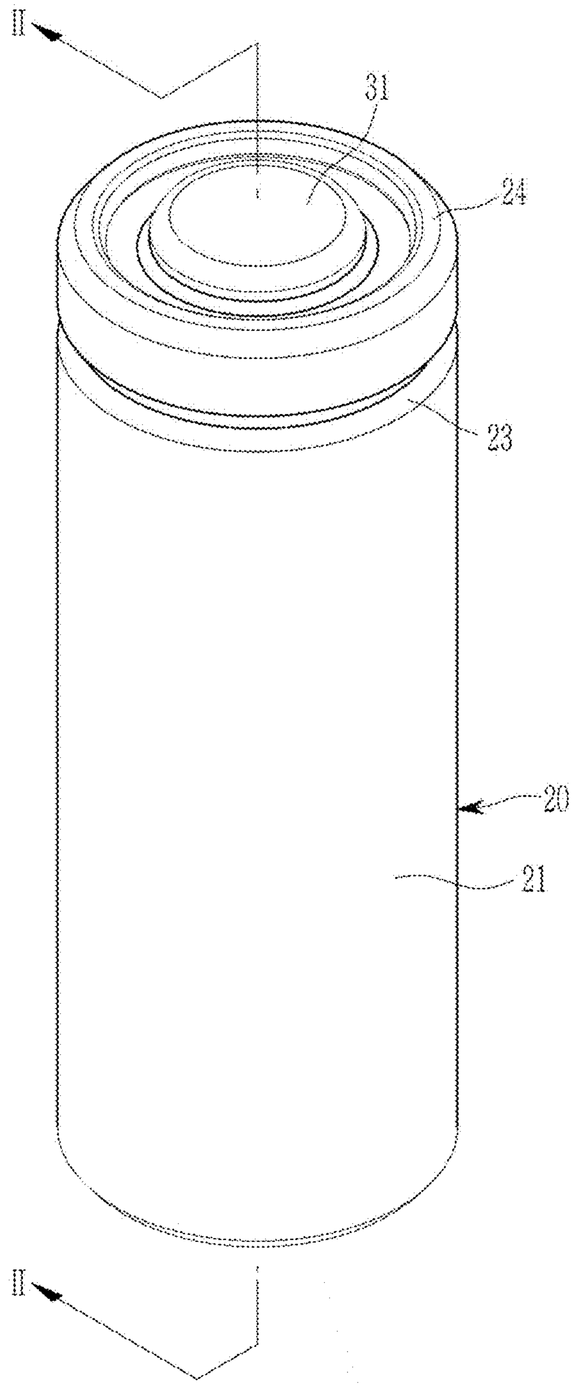
FIG. 1 is a perspective view of a secondary battery according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The present disclosure covers all modifications, equivalents, and replacements within the idea and technical scope of the present disclosure. Further, each of the features of the various embodiments of the present disclosure may be combined or combined with each other, in part or in whole, and technically various interlocking and driving are possible. Each embodiment may be implemented independently of each other or may be implemented together in an association.

In the drawings, the relative sizes of elements, layers, and regions may be exaggerated for clarity and/or descriptive purposes. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to" may be construed similarly. It will be understood that when an element or layer is referred to as being "between" two elements or layers, it can be the only element or layer between the two elements or layers, or one or more intervening elements or layers may also be present.

For the purposes of this disclosure, expressions, such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression, such as "at least one of A and B" and "at least one of A or B" may include A, B, or A and B. As used herein, "or" generally means "and/or," and the term "and/or" includes any and all combinations of one or more of the associated listed items. For example, the expression, such as “A and/or B” may include A, B, or A and B. Similarly, expressions, such as “at least one of,” “a plurality of,” “one of,” and other prepositional phrases, when preceding a list of elements, modify the entire list of elements and do not modify the individual elements of the list.

It will be understood that, although the terms “first,” “second,” “third,” etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a “first” element may not require or imply the presence of a second element or other elements. The terms “first,” “second,” etc. may also be used herein to differentiate different categories or sets of elements. For conciseness, the terms “first,” “second,” etc. may represent “first-category (or first-set),” “second-category (or second-set),” etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms “a” and “an” are intended to include the plural forms as well, while the plural forms are also intended to include the singular forms, unless the context clearly indicates otherwise. It will be further understood that the terms “comprises,” “comprising,” “have,” “having,” “includes,” and “including,” when used in this specification, specify the presence of the stated features, integers, steps, operations, elements, and/or components, but do not preclude the presence or addition of one or more other features, integers, steps, operations, elements, components, and/or groups thereof.

As used herein, the term “substantially,” “about,” “approximately,” and similar terms are used as terms of approximation and not as terms of degree, and are intended to account for the inherent deviations in measured or calculated values that would be recognized by those of ordinary skill in the art. “About” or “approximately,” as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, “about” may mean within one or more standard deviations, or within +30%, 20%, 10%, 5% of the stated value. Further, the use of “may” when describing embodiments of the present disclosure refers to “one or more embodiments of the present disclosure.”

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
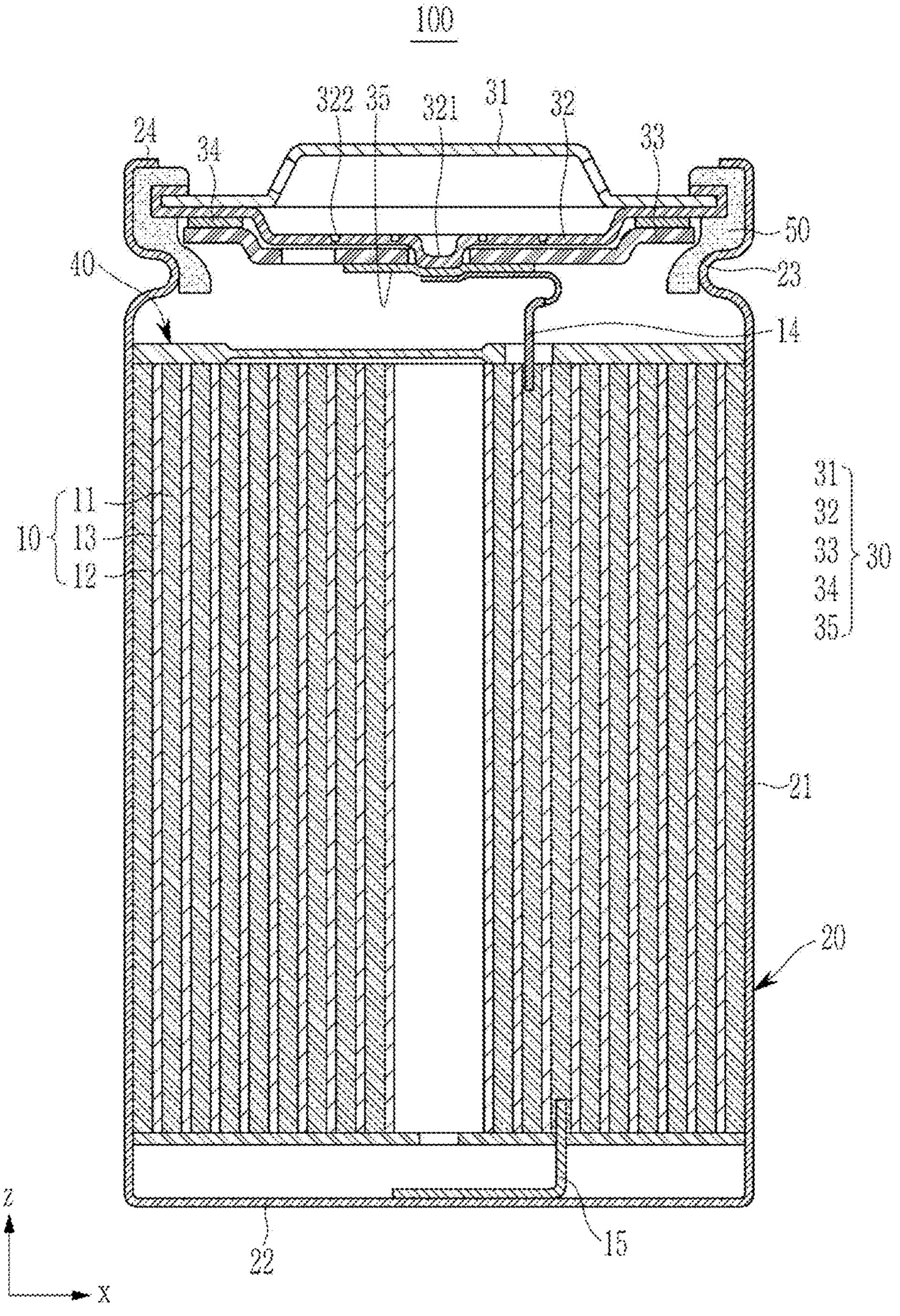
FIG. 2 is a cross-sectional view of the secondary battery of FIG. 1, taken along the line II-II.

FIG. 1 is a perspective view of a secondary battery according to one or more embodiments of the present disclosure, and FIG. 2 is a cross-sectional view of the secondary battery of FIG. 1, taken along the line II-II. Although the cylindrical secondary battery is described below for convenience, the technical idea of the present disclosure is not limited to the cylindrical secondary battery, and covers all secondary batteries of other shapes, such as prismatic shapes.

Referring to FIG. 1 and FIG. 2, a secondary battery 100 according to one or more embodiments includes an electrode assembly 10, a case 20 that accommodates the electrode assembly 10 and an electrolyte solution therein, a cap assembly 30 coupled to an opening of the case 20 and sealing the case 20, and an insulating plate 40 located between the electrode assembly 10 and the cap assembly 30 in the case 20.

The electrode assembly 10 may include a separator 13, and a first electrode 11 and a second electrode 12 with the separator 13 interposed therebetween, and may be wound in a jelly-roll form.

The first electrode 11 includes a first member and a first active material layer located on the first member. Among the first members, a first lead tab 14 may extend outwardly from a first uncoated portion where the first active material layer is not positioned, and the first lead tab 14 may be electrically connected to the cap assembly 30.

The second electrode 12 includes a second member, and a second active material layer located on the second member. A second lead tab 15 may extend outwardly from a second uncoated portion where the second active material layer is not positioned among the second members, and the second lead tab 15 may be electrically connected to the case 20. The first lead tab 14 and the second lead tab 15 may extend in opposite directions.

The first electrode 11 may function as a positive electrode. In this case, the first member may be formed of, for example, aluminum foil, and the first active material layer may include, for example, a transition metal oxide. The second electrode 12 may function as a negative electrode. In this case, the second member may be formed of, for example, copper foil or nickel foil, and the second active material layer may include, for example, graphite.

The separator 13 serves to reduce or prevent the likelihood of a short circuit between the first electrode 11 and the second electrode 12 while allowing lithium ion to move. The separator 13 may be formed of, for example, a polyethylene film, a polypropylene film, a polyethylene-polypropylene film, and the like.

The case 20 accommodates the electrode assembly 10 and the electrolyte solution, and forms the external appearance of the secondary battery 100 together with the cap assembly 30. The case 20 may include a body portion 21 having a substantially cylindrical shape, and a bottom portion 22 connected to one side of the body portion 21. A beading portion 23 deformed toward the inside may be located on the body portion 21, and a crimping portion 24 bent toward the inside may be located on an opening end of the body portion 21.

The beading portion 23 may suppress movement of the electrode assembly 10 inside the case 20, and may facilitate seating of a gasket 50 and the cap assembly 30. The crimping portion 24 may firmly fix the cap assembly 30 by pressing the edge of the cap assembly 30 through the gasket 50. The case 20 may be formed of, for example, iron plated with nickel.

The electrolyte solution may include a lithium salt and an organic solvent. The lithium salt may include $LiPF_6$, $LiBF_4$, and the like, and the organic solvent may include ethylene carbonate (EC), propylene carbonate (PC), diethyl carbonate (DEC), dimethyl carbonate (DMC), ethyl methyl carbonate (EMC), and/or the like.

The cap assembly 30 may be fixed to the inside of the crimping portion 24 through the gasket 50 to seal the case 20. The cap assembly 30 may include a cap up 31, a safety vent 32, a cap down 33, an insulation member 34, and a sub-plate 35, but is not limited to these examples and can be modified in various ways.

The cap up 31 may be located at the top of the cap assembly 30. The cap up 31 may include a terminal portion for convexly protruding upwardly and connected to an external circuit, and an outlet portion for discharging gas may be located around the terminal portion.

The safety vent 32 may be located below the cap up 31. The safety vent 32 may include a protruding portion 321 that convexly protrudes downwardly and connected to the sub-plate 35, and at least one notch 322 located around the protruding portion 321.

If gas is generated due to overcharging or abnormal operation of the secondary battery 100, the protruding portion 321 is deformed upwardly by pressure and separated from the sub-plate 35, while the safety vent 32 may be cut along the notch 322. The cut safety vent 32 releases gas to the outside to reduce or prevent the likelihood of explosion of the secondary battery 100.

The cap down 33 may be located below the safety vent 32. A first opening for exposing the protruding portion 321 of the safety vent 32, and a second opening for gas discharge may be located in the cap down 33. The insulation member 34 is located between the safety vent 32 and the cap down 33 to insulate the safety vent 32 and the cap down 33.

The sub-plate 35 may be located below the cap down 33. The sub-plate 35 may be fixed to a lower surface of the cap-down 33 to block the first opening of the cap-down 33, and the protruding portion 321 of the safety vent 32 may be fixed to the sub-plate 35. The first lead tab 14 drawn out from the electrode assembly 10 may be fixed to the sub-plate 35. Therefore, the cap up 31, the safety vent 32, the cap down 33, and the sub-plate 35 may be electrically connected to the first electrode 11 of the electrode assembly 10.

The insulating plate 40 may be located to be in contact with the electrode assembly 10 under the beading portion 23, and a tab opening 41 (see FIG. 3) for drawing out the first lead tab 14 may be provided in the insulating plate 40. The cap assembly 30 electrically connected to the first electrode 11 by the first lead tab 14 faces the electrode assembly 10 with the insulating plate 40 therebetween, and may maintain an insulation state with the electrode assembly 10 by the insulating plate 40.

Figure 3:
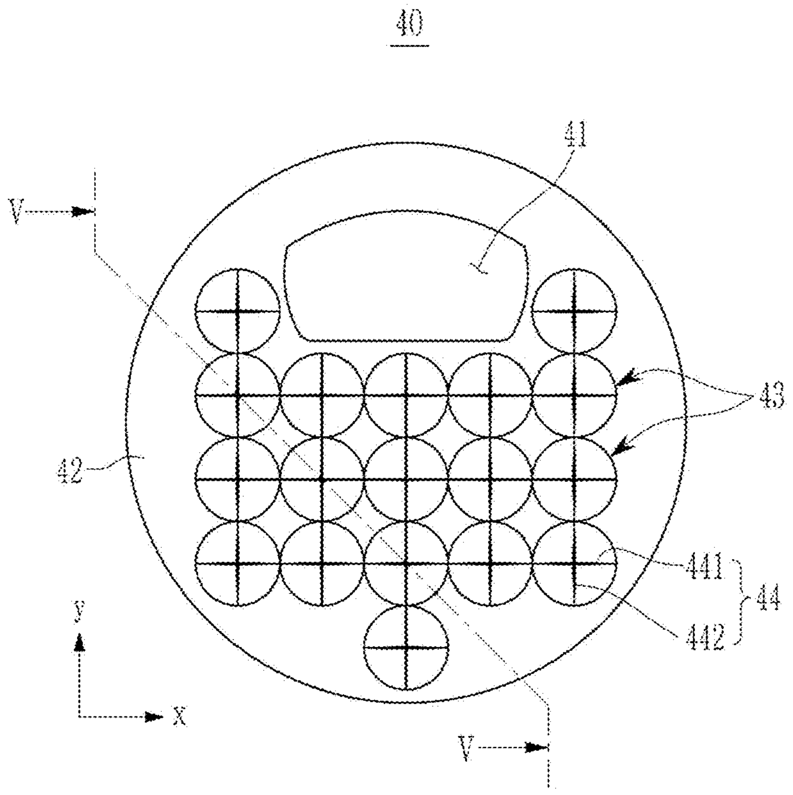
FIG. 3 is a top plan view of an insulating plate of the secondary battery shown in FIG. 2.
Figure 4:
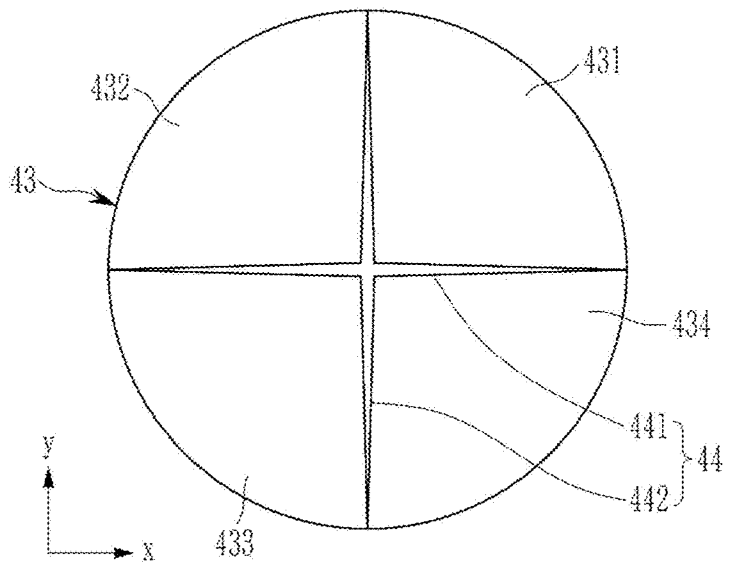
FIG. 4 is a partially enlarged view of the insulating plate of FIG. 3.
Figure 5:
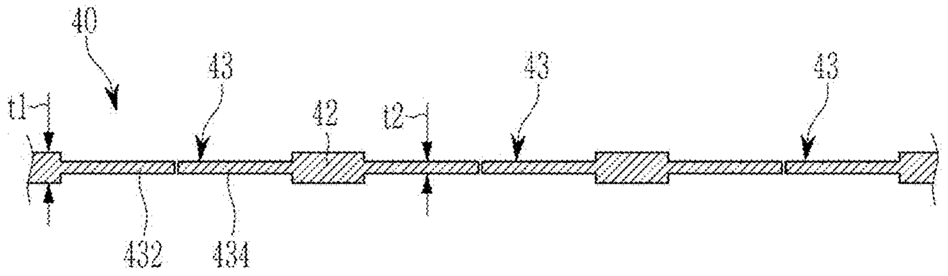
FIG. 5 is a cross-sectional view of the insulating plate of FIG. 3, taken along the line V-V.

FIG. 3 is a top plan view of the insulating plate of the secondary battery illustrated in FIG. 2, FIG. 4 is a partially enlarged view of the insulating plate of FIG. 3, and FIG. 5 is a cross-sectional view of the insulating plate of FIG. 3, taken along the line V-V.

Referring to FIG. 3 to FIG. 5, the insulating plate 40 may include a base portion 42 having a first thickness t1, and may include a plurality of thin film portions 43 having a second thickness t2 that is less than the first thickness t1, and each of the plurality of thin film portions 43 has a cutout 44.

The base portion 42 may have a disk shape, and a tab opening 41 may be located at the base portion 42. The tab opening 41 may be located biased to one side from a center point of the base portion 42. The plurality of thin film portions 43 may be formed in a generally circular shape, and all may have substantially the same diameter.

The plurality of thin film portions 43 may be surrounded by the base portion 42, and may be integrally connected to the base portion 42. The insulating plate 40 may be formed of a polypropylene (PP) film, but is not limited to this example.

The plurality of thin film portions 43 may be aligned side by side along a first direction (x-axis direction) and along a second direction (y-axis direction) that is orthogonal to the first direction (x-axis direction). The plurality of thin film portions 43 may be arranged at a distance from each other, or may be arranged to contact each other along the first direction (x-axis direction) and second direction (y-axis direction). FIG. 3 shows the latter case as an example, and in this case, it is possible to secure the maximum size and number of thin film portions 43 in the insulating plate 40.

The cutout 44 may be formed linearly, for example, formed in a cross shape. The cross-shaped cutout 44 may include, for example, a first cutout line 441 parallel to the first direction (x-axis direction) and a second cutout line 442 parallel to the second direction (y-axis direction). A length of the first cutout line 441 and a length of the second cutout line 442 may be the same.

Each of the plurality of thin film portions 43 may include four thin films 431, 432, 433, and 434 separated by the first cutout line 441 and the second cutout line 442. The four thin films 431, 432, 433, and 434 are separated from each other by the first cutout line 441 and the second cutout line 442, but all of the four thin films 431, 432, 433, and 434 are connected to the base portion 42 to maintain positions fixed by the base portion 42.

The cutout 44 functions as an opening through which the electrolyte solution passes downwardly, and through which the gas generated in the electrode assembly 10 is discharged upwardly. Depending on the degree of injection of the electrolyte solution and the pressure of the discharged gas, the aperture area is adjusted as the degree of deformation of the thin films 431, 432, 433, and 434 changes. The number and position of the cutout 44 in each of the plurality of thin film portions 43 is not limited to the illustrated example, and may vary.

Figure 6A:
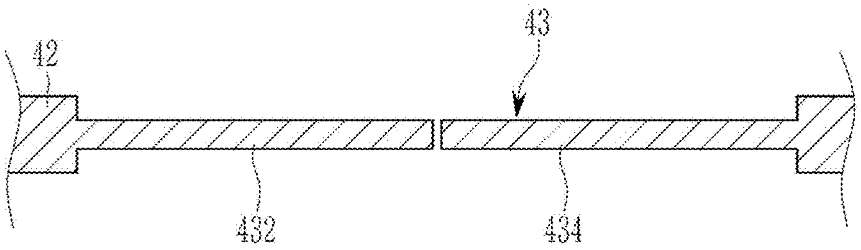
FIG. 6A to FIG. 6C are cross-sectional views of a thin film portion of the insulating plate shown in FIG. 3.
Figure 6B:
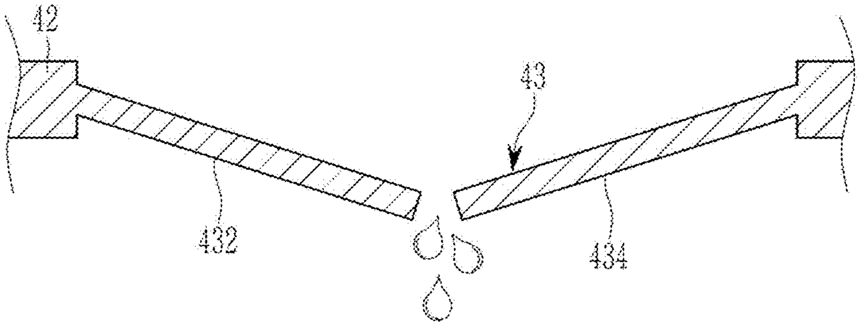
Figure 6C:
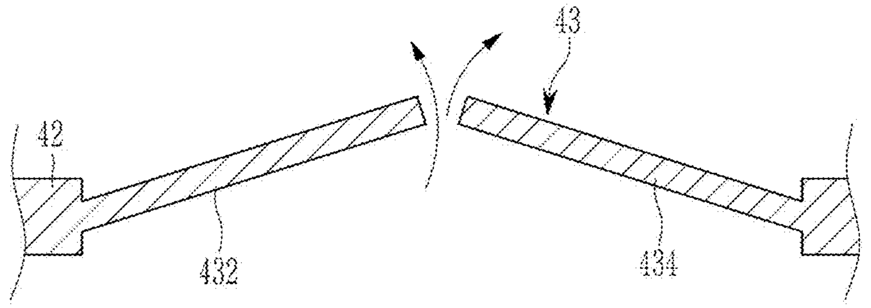

FIG. 6A to FIG. 6C are cross-sectional views of the thin film portion of the insulating plate shown in FIG. 3.

Referring to FIG. 6A, at normal times, or during normal operation, the thin film portions 43 are positioned side by side on the same plane as the base portion 42, and maintain a closed state.

Referring to FIG. 6B, if the electrolyte solution is injected, the thin film portions 43 sag downwardly due to the weight or force of the electrolyte solution, and the opening area of the insulating plate 40 increases. For example, the entire thin film portions 43 are convexly deformed downwardly, and the plurality of thin films 432 and 434 are positioned lower, as they are farther from the base portion 42.

The insulating plate 40 may facilitate injection of the electrolyte solution toward the electrode assembly 10 due to the expansion of the opening area. If the injection of the electrolyte solution is completed, the thin film portions 43 are restored to their initial position and remain closed.

Referring to FIG. 6C, during the use of the secondary battery, gas may be generated from the electrode assembly 10 due to various reasons. In this case, the thin film portions 43 are deformed upwardly by the pressure of the gas, and the opening area of the insulating plate 40 increases. For example, the entire thin film portions 43 may be convexly deformed upwardly, and the plurality of thin films 432 and 434 are positioned higher as they are farther away from the base portion 42.

The insulating plate 40 may facilitate gas discharge toward the cap assembly 30 due to the expansion of the opening area, and can reduce or prevent the likelihood of secondary battery explosion. When the gas discharge is completed, the thin film portions 43 are restored to their initial position and remain closed.

The insulating plate 40 having the above configuration has a configuration in which the opening area is automatically adjusted while the thin film portions 43 are deformed by external pressure, for example, pressure and gas pressure due to electrolyte solution injection. Because it is suitable to inject electrolyte solution and to discharge gas, the insulating plate 40 can reliably insulate between the electrode assembly 10 and the cap assembly 30 by maintaining a normally closed state.

While the present disclosure has been described in connection with what is presently considered to be practical embodiments, it is to be understood that the disclosure is not limited to the disclosed embodiments. The present disclosure is intended to cover various modifications and equivalent arrangements included within the spirit and scope of the appended claims, with functional equivalents thereof to be included therein.

What is claimed is:

1. A secondary battery comprising:

an electrode assembly comprising a lead tab;

a case accommodating the electrode assembly and an electrolyte solution;

a cap assembly electrically connected to the lead tab, and coupled to the case to seal the case; and an insulating plate between the electrode assembly and the cap assembly in the case, defining a tab opening for drawing out the lead tab, and comprising thin film portions respectively defining cutouts for passage of electrolyte solution or gas.

2. The secondary battery as claimed in claim 1, wherein the insulating plate comprises a base portion integrally connected to the thin film portions and surrounding the thin film portions in plan view, and wherein the tab opening is defined by the base portion.

3. The secondary battery as claimed in claim 2, wherein the base portion has a first thickness, and wherein the thin film portions have a second thickness that is less than the first thickness.

4. The secondary battery as claimed in claim 1, wherein the thin film portions are circular, and have a same diameter.

5. The secondary battery as claimed in claim 1, wherein the thin film portions contact each other and are aligned along two directions that are orthogonal to each other.

6. The secondary battery as claimed in claim 1, wherein the cutouts comprise a cross-shaped cutout portion comprising a first cutout line and a second cutout line that are orthogonal to each other to separate the thin film portions into four thin films.

7. A secondary battery comprising:

an electrode assembly comprising a lead tab;

a case accommodating the electrode assembly and an electrolyte solution;

a cap assembly electrically connected to the lead tab, and coupled to the case to seal the case; and an insulating plate between the electrode assembly and the cap assembly in the case, and defining a tab opening for drawing out the lead tab, wherein the insulating plate comprises thin film portions, each of the thin film portions including thin films separated by cutouts, and the thin films are configured to be deformed by external pressure to change an opening area of the insulating plate.

8. The secondary battery as claimed in claim 7, wherein the thin film portions touch each other, and are aligned along a first direction and a second direction that are orthogonal to each other.

9. The secondary battery as claimed in claim 8, wherein the thin film portions are circular.

10. The secondary battery as claimed in claim 8, wherein the cutouts comprise a cross-shaped cutout portion comprising a first cutout line and a second cutout line that are orthogonal to each other.

11. The secondary battery as claimed in claim 7, wherein the thin films are configured to be deformed convexly toward the electrode assembly when the electrolyte solution is injected to enlarge the opening area of the insulating plate, and are configured to return to an initial position after the electrolyte solution injected.

12. The secondary battery as claimed in claim 7, wherein the thin films are configured to be deformed convexly toward the cap assembly when gas is generated in the electrode assembly to enlarge the opening area of the insulating plate, and are configured to return to an initial position after the gas is discharged.

* * * * *